United States Patent [19]

Meyer

[11] 4,452,202
[45] Jun. 5, 1984

[54] VACUUM PRESSURE TRANSDUCER

[75] Inventor: Paul M. Meyer, East Alton, Ill.

[73] Assignee: ACF Industries, Inc., New York, N.Y.

[21] Appl. No.: 334,452

[22] Filed: Dec. 24, 1981

[51] Int. Cl.³ .......................... F02D 5/00; G01L 7/08
[52] U.S. Cl. ...................................... 123/494; 73/115; 73/723
[58] Field of Search ................. 123/494, 407; 73/723, 73/717, 745, 115

[56] References Cited

U.S. PATENT DOCUMENTS

| | | | |
|---|---|---|---|
| 1,354,069 | 9/1920 | Terhaar | 73/723 |
| 2,900,967 | 8/1959 | Sutton | 123/494 |
| 3,884,195 | 5/1975 | Murtin et al. | 123/494 |
| 3,911,872 | 10/1975 | Hughes | 123/494 |
| 3,922,909 | 12/1975 | Dixson t al. | 73/115 |

Primary Examiner—Andrew M. Dolinar
Attorney, Agent, or Firm—J. Joseph Muller

[57] ABSTRACT

A vacuum pressure transducer (1) for sensing vacuum pressure levels and for developing an electrical signal indicative of the vacuum pressure sensed. A housing (3A, 3B) has an inlet (5) connected to a vacuum source (M). A flexible diaphragm (7) extends across the housing for one side of the diaphragm to be exposed to vacuum pressure, the diaphragm flexing within the housing as vacuum pressure changes. An electrical contact (13) is coupled to the diaphragm and movable therewith, and an electrical switch (25) includes a plurality of electrically conductive segments (27) arranged in a predetermined pattern. The electrical contact contacts one or more of the segments as it moves with diaphragm, each combination of segments contacted by the electrical contact at any one time representing a discrete vacuum pressure.

8 Claims, 6 Drawing Figures

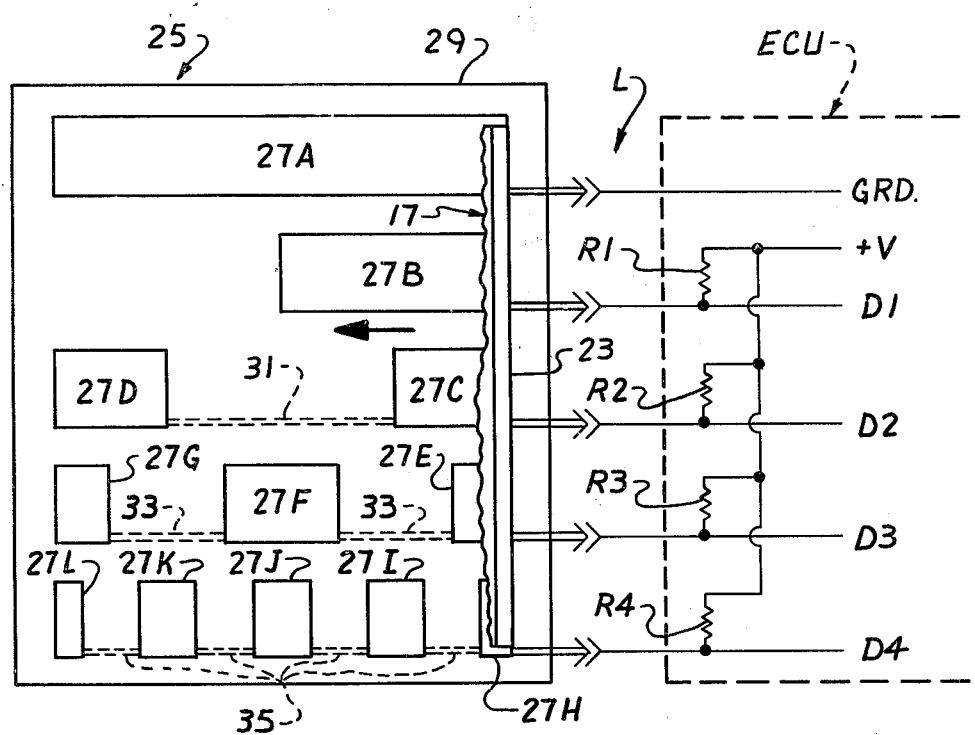
FIG. 4
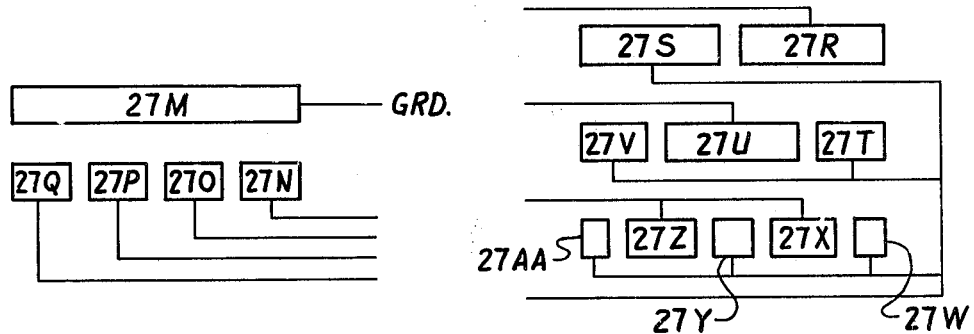
FIG. 5
FIG. 6

VACUUM PRESSURE TRANSDUCER

BACKGROUND OF THE INVENTION

This invention relates to transducers and more particulary to a pressure transducer for use in a feedback control systems for automobile engines for sensing engine manifold vacuum.

Presently, many automobile engines employ a feedback control system for controlling the quantity of fuel and air mixed together and supplied to the engine for combustion. This control is important because it both helps reduce automobile engine pollutions and because it improves engine fuel economy. Typically, the various control strategies employed require sensors to sense various engine operating parameters and develop electrical signals which are supplied to an electronic controller. The electronic controller processes these signals and develops an electrical control signal which, in turn, is provided to an electromechanical device regulating the quantity of fuel mixed with air.

One input required in feedback control strategies is intake manifold vacuum pressure. In many control strategies, a manifold absolute pressure transducer (MAP), is used for this purpose, but the cost of such a transducer is relatively high. Consequently, there is need for a manifold pressure transducer which can be used with the control strategy but which is capable of providing the same information as a manifold absolute pressure transducer at a much lower cost.

SUMMARY OF THE INVENTION

Among the several objects of the present invention may be noted the provision of a vacuum pressure transducer for sensing vacuum pressure levels and for developing an electrical signal indicative of these levels; the provision of such a transducer which may be readily employed with a feedback control strategy for automobile engines to provide manifold vacuum pressure information; the provision of such a transducer for providing this information in digital rather than analog form thus eliminating the need of converting the transducer output from analog to digital; the provision of such a transducer for providing a discrete digital output signal indicating each of a plurality of manifold vacuum pressure levels; the provision of such a transducer which is readily accomodated in the engine compartment of an automobile; and, the provision of such a transducer which is low in cost compared to conventional manifold absolute pressure transducers.

Briefly, the present invention is for a vacuum pressure transducer which senses vacuum pressure levels and develops an electrical signal indicative of the pressure level sensed. A housing has an inlet connected to a vacuum source such as the manifold of an internal combustion automobile engine. A flexible diaphragm extends across the housing for one side of the diaphragm to be exposed to vacuum pressure. The diaphragm flexes within the housing as vacuum pressure changes. An electrical contact is coupled to the diaphragm and moves therewith. And, an electrical switch is provided which includes a plurality of electrically conductive segments arranged in a predetermined pattern. The electrical contact contacts one or more of these segments as it moves with the diaphragm. Each combination of segments contacted by the electrical contact at any one time represents a discrete vacuum pressure. Other objects and features will be in part apparent and in part pointed out hereinafter.

BRIEF DESCRIPTION OF THE DRAWINGS

FIG. 4 illustrates a preferred pattern or arrangement of electrically conductive segments by which discrete digital electrical signals are generated for sensed discrete vacuum levels; and, FIGS. 5 and 6 illustrate alternate arrangements or patterns of electrically conductive segments used in the transducer of the present invention.

Corresponding reference characters indicate corresponding parts throughout the several views of the drawings.

DESCRIPTION OF A PREFERRED EMBODIMENT

Figure 1:
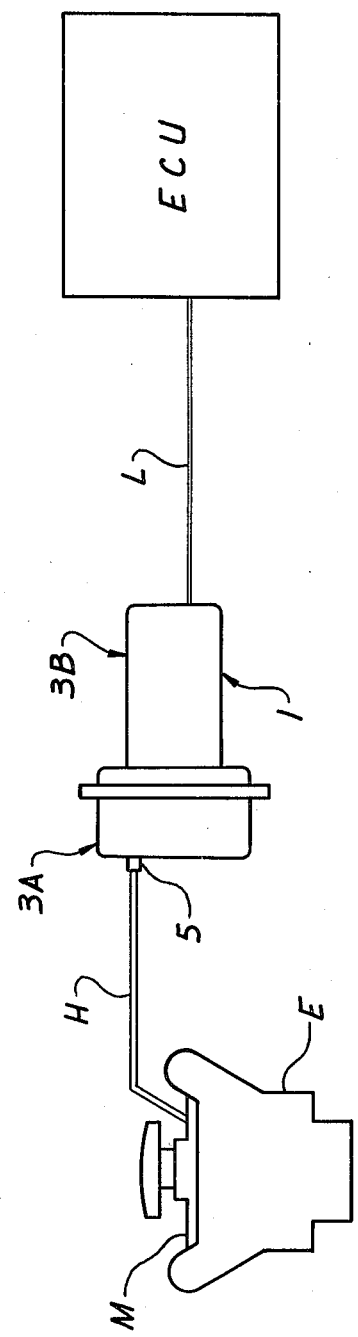
FIG. 1 is a schematic diagram illustrating a transducer of the present invention as used in a feedback control system for an internal combustion automobile engine.

Referring to FIG. 1, a vacuum pressure transducer of the present invention is indicated generally 1. Transducer 1 is connected to intake manifold M of an internal combustion engine E by an appropriate hose H. Vacuum pressure transducer 1 senses manifold vacuum and develops an electrical signal which is supplied to an electronics control unit ECU via a line L. Electronics control unit ECU receives the input from transducer 1 together with the inputs from a number of other sensors (not shown) and processes these signals as is well known in the art, to produce an electrical control signal which is supplied to an electromechanical device (also not shown). The electromechanical device in response to the control signal from electronics control unit ECU controls the quantity of fuel mixed with air and supplied to engine E so to control the air-fuel ratio of the mixture. Control of the air-fuel ratio of the mixture supplied to engine E is beneficial in that it helps control emissions from the engine as well as maximizes engine fuel economy.

Figure 2:
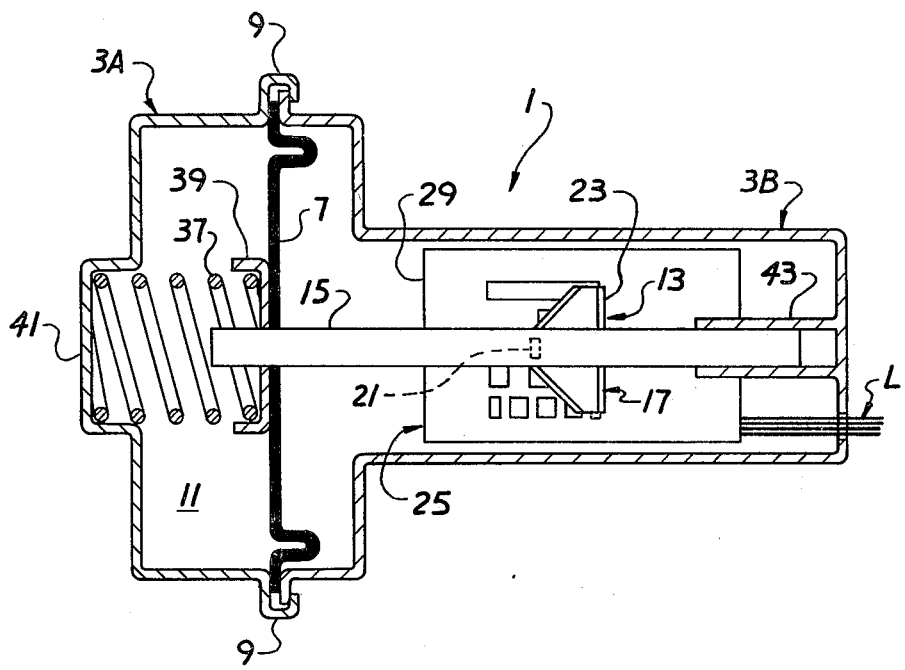
FIGS. 2 and 3 respectively are top plan and side elevational views, in section, of the transducer of the present invention.
Figure 3:
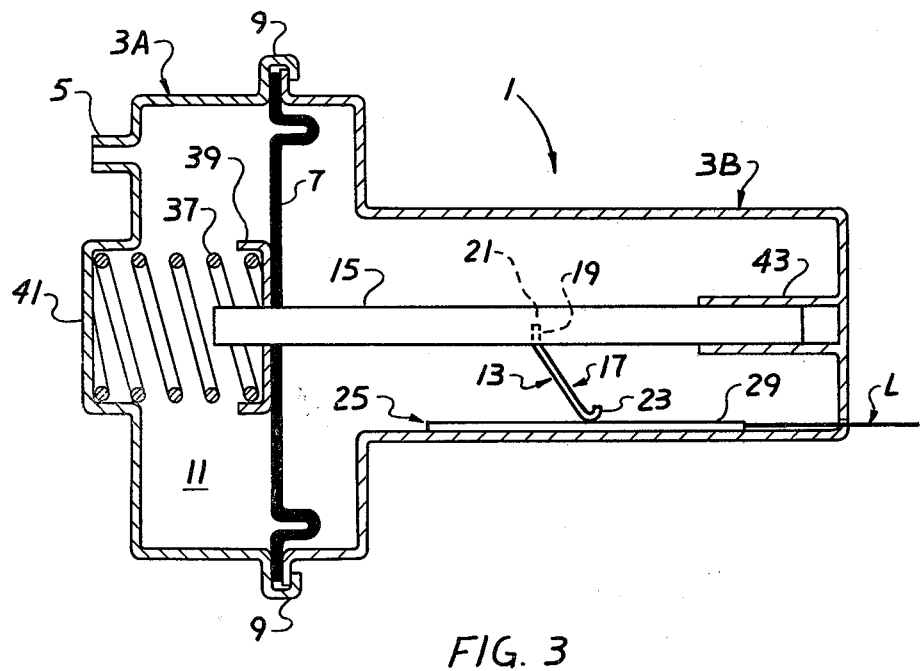

Referring to FIGS. 2 and 3, vacuum pressure transducer 1 comprises a two-piece housing composed of housing segments 3A and 3B. Housing section 3A has a cylindrical cup shape, and as shown in FIG. 3, a nipple 5 is formed in the base of the cup. One end of hose H fits over nipple 5 so vacuum in intake manifold M is communicated to the interior of Transducer 1. Housing section 3B is also of cylindrical cup shape but has a deep drawn center cylindrical section. The outer rims of both sections 3A and 3B are outwardly turned, and a flexible diaphragm 7 is positioned between the housing sections with the outer margin of the diaphragm resting between the rims of the two housing sections. The outer margin 9 of the rim of housing 3A is spun over or otherwise turned over the rim of housing section 3B to form a transducer 1 assembly. Flexible diaphragm 7, together with the inner wall of housing section 3A, forms a chamber 11 which is subjected to the vacuum created in engine manifold M and communicated to transducer 1 via hose H and nipple 5. Thus, one side of diaphragm 7 is exposed to engine vacuum, the diaphragm flexing within the housing of transducer 1 has manifold vacuum pressure changes.

The transducer of the present invention further includes an electrical contact means indicated generally 13 coupled to diaphragm 7 and movable therewith. A shaft 15 has one end attached to diaphragm 7 and the shank portion of the shaft extends longitudinally of the deep drawn section of housing section 3B. Shaft 15 moves with diaphragm 7 as it moves in accordance with changes in manifold vacuum pressure. Electrical contact means 13 is connected to this shaft and comprises a wiper 17 made of an electrically conductive material. As shown in FIG. 3, wiper 17 depends from shaft 15. The wiper has an upper tab end 19 received in a slot 21 formed in shaft 15. The center section of wiper 17 extends generally rearwardly from the upper end of the wiper and terminates in a curved end 23. As shown in FIG. 2, the lower end of wiper 17, i.e. the lower curved end 23 of the wiper is substantially wider than the upper end of the wiper, i.e. the end of wiper 17 adjacent tab portion 19 thereof.

Transducer 1 further includes electrical switch means 25 which includes a plurality of electrically conductive segments 27 arranged in a predetermined pattern as shown in FIGS. 2, 4, 5, and 6. As best shown in FIGS. 2 and 4, electrical switch means 25 comprises a board 29 of electrically non-conductive material on which the electrically conductive segments 27 are arranged in the predetermined pattern. As shown in FIGS. 2 and 3, board 29 is positioned in housing section 3B such that wiper 17 passes over the various electrically conductive segments as shaft 15 moves in response to changes in manifold vacuum pressure, the wiper making electrical contact with each segment as it passes over the segment. With reference to FIG. 4, the predetermined pattern for the electrically conductive segments 27 is such that a first segment 27A extends substantially the length of board 29. A second electrically conductive segment 27B extends approximately half-way the length of board 29 beginning from the rearward end of the board. Next, two segments, 27C and 27D, are arranged so segment 27C is at the rearward end of board 29 while segment 27D, which is longitudinally aligned with segment 27C, is positioned at the opposite or forward end of the board. Further, another set of segments, 27E, 27F and 27G, are arranged on the board such that segment 27E is at the rearward end of the board segment; 27F is positioned essentially in the middle of the board; while, section 27G is positioned at the forward end of the board. Again, segments 27E, 27F and 27G are aligned longitudinally with each other. Lastly, five electrically conductive segments, 27H through 27L, are aligned longitudinally along the lower end of board 29 as viewed in FIG. 4. Here, segment 27H is at the rearward end of the board, segment 27L is at the forward end of the board and segments 27I, 27J and 27K are positioned intermediate the two end segments. The pattern of electrically conductive segments shown in FIG. 4 is the same as that for the board shown in FIG. 2. Reference characters have not been used for the electrically conductive segments shown in FIG. 2 for the sake of drawing clarity.

The electrically conductive segments 27 on board 29 are electrically connected to electronics control unit ECU via electrical leads carried in line L. As shown in FIG. 4, electrically conductive segment 27A is tied to an electrical ground in the electronics control unit, while segments 27B, 27C, 27E, and 27H are each connected to a voltage source through respective resistors R1, R2, R3, and R4. Electrically conductive segment 27C is tied to electrically conductive segment 27D through an electrical path 31. In the same manner, electrically conductive segments 27E, 27F and 27G are interconnected through an electrical path 33; while, electrically conductive segments 27H through 27L are electrically interconnected through an electrical path 35. Each electrical input from the electronics control unit to the electrically conductive segments on board 29 is also routed to the electronics control unit as data inputs D1-D4. Each data input D1-D4 represents one bit of a four bit digital input to the electronics control unit so the signal from transducer 1 representing manifold vacuum pressure is, in effect, a binary rather than an analog signal input to the electronics control unit. This has the advantage in that it eliminates the need to convert the electrical signal from the transducer from analog to digital.

As shown in FIGS. 2 and 4, and as previously discussed, wiper 17 is electrically conductive and extends across the width of board 29 so as to contact all electrically conductive segments 27. As shown in FIG. 4, when diaphragm 7 is at the position shown in FIGS. 2 and 3, trailing edge 23 o wiper 17 is at the right or rearward end of board 29. In this position, wiper 17 contacts and effectively shorts electrically conductive segments 27B, 27C, 27E and 27H to segment 27A which corresponds to electrical ground. This means inputs D1-D4 to the electronics control unit are each grounded and represent, for example, four logic low inputs to the electronics control unit. As manifold vacuum increases, chamber 11 of transducer 1 is exposed to the increasing vacuum pressure and flexible diaphragm 7 is drawn to the left as viewed in FIGS. 2 and 3. Shaft 15 therefore moves leftward as viewed in these figures and wiper 17 moves in the direction of the arrow shown in FIG. 4. When diaphragm 7 has moved sufficiently far to the left, trailing end 23 of wiper 17 moves off electrically conductive pad 27H, so now only segments 27B, 27C and 27E are shorted to segment 27A. Consequently, the voltage supplied to pad 27H through resistor R4 is also supplied to the electronics control unit via input line D4. This means that now inputs D1, D2 and D3 are still grounded or logic low while input D4 is now a logic high. This, in turn, represents a new or higher level manifold vacuum pressure condition.

As manifold vacuum continues to increase and as diaphragm 7 is further drawn to the left as viewed in FIGS. 2 and 3, wiper 17 continues to move to the left. As it continues its leftward movement, electrically conductive segment 27E is also uncovered by trailing end 23 of the wiper arm so now only electrically conductive segments 27B and 27C are grounded through electrically conductive segment 27A while the voltage supplied to electrically conductive segments 27E and 27H both permit voltage to be supplied to inputs D3 and D4 of the electronics control unit. For this new condition, inputs D1 and D2 are a logic low while inputs D3 and D4 are now logic high. This thus represents another discrete manifold vacuum pressure.

As can be seen by viewing the pattern of electrically conductive segments 27 in FIG. 4, the continued movement of wiper arm 17 to the left, as shown by the arrow in this figure, continues to uncover various electrically conductive segments and to begin to cover others. Thus, the various inputs D1-D4 to the electronics control unit have changing high and low level conditions for the changing manifold vacuum pressures; each pattern of logic highs and lows representing a discrete manifold vacuum pressure. If the manifold vacuum pressure decreases so diaphragm 7 moves to the right as shown in FIGS. 2 and 3 under the force of a spring 37, the wiper will move the right as viewed in FIG. 4. The inputs D1-D4 to the electronics control unit will again change to reflect this decreasing manifold vacuum pressure. As a consequence, each of, for example, sixteen different manifold vacuum pressures can be discretely represented to electronics control unit ECU by the pattern layout shown in FIG. 4.

It should be understood that the number of discrete vacuum pressure levels sensed by the arrangement of electrically conductive segments 27 on board 29 can be varied. Thus as shown in FIG. 5 only four levels of manifold vacuum pressure will be indicated given the arrangement shown. Here, electrically conductive segment 27M is connected to electrical ground while segments 27N-27Q are each connected in the same manner as shown in FIG. 4 with a voltage being supplied to each segment through a resistive element with a data input line returning to the electronics control unit. For the pattern shown in FIG. 5 with segments 27N-27Q longitudinally aligned, there are only four output conditions possible and therefore only four discrete manifold vacuum pressure levels sensed.

With respect to the pattern layout of the electrical segments 27R-27AA shown in FIG. 6, eight discrete manifold vacuum pressures can be sensed. It will be understood that different arrangements other than those shown in FIGS. 4, 5 and 6 are possible depending upon the information required.

Referring again to FIGS. 2 and 3, spring 37 seats against a backing plate 39 carried on the face of diaphragm 7 facing into chamber 11 and against a seat 41 formed in the base of housing section 3A. In addition, housing section 3B has a guide section 43 extending inwardly from the rear wall of the section to support shaft 15 for reciprocal movement as manifold vacuum pressure changes. The distal end of shaft 15 moves in this guide 43.

As described, transducer 1 provides a low cost unit for sensing manifold pressure and providing a electrical signal to an electronics control unit. As discussed, this electrical signal provides digital information directly to the electronics control unit. The transducer is not only low in cost but because the electrically conductive segments on board 29 can be rearranged in varying patterns as shown in FIGS. 4 through 6, the transducer can provide different levels of information to the electronics control unit depending upon the degree of information concerning manifold vacuum pressure required by the electronics control unit in processing information to develop an electrical control signal supplied to an electromechanical device controlling air-fuel mixture ratios. Transducer 1 is sized so to easily be located within the engine compartment and readily connected to the manifold M of engine E and to the electronics control unit.

In view of the above, it will be seen that the several objects of the invention are achieved and other advantages results attained.

As various changes can be made of the above constructions without departing from the scope of the invention, it is intended that all the matter contained in the above description are shown in the accompanying drawings shall be interpreted as illustrative and not in limiting sense.

What is claimed is:

1. A vacuum pressure transducer for sensing vacuum pressure levels and for developing an electrical signal indicative of the vacuum pressure sensed, comprising:
   a housing having an inlet connected to a vacuum source;
   a flexible diaphragm extending across the housing for one side of the diaphragm to be exposed to vacuum pressure;
   electrical switch means including a plurality of electrically conductive segments arranged in a predetermined pattern on an electrically non-conductive board;
   a shaft attached to the diaphragm and axially movable therewith; and
   electrical contact means connected to the shaft for making electrical contact with the segments, the electrical contact means including a wiper depending from the shaft and made of an electrically conductive material, the wiper having an upper tab end received in a slot formed in the shaft and a lower end which forms a continuous curved contact surface the width of which extends across the board on which the segments are arranged thereby to contact one or more of the segments at any one time and produce a digital electrical signal representing the vacuum pressure at that time.

2. The transducer of claim 1 wherein the width of the lower end of the wiper is substantially wider than the width of the upper end thereof.

3. The transducer of claim 1 further including guide means for the shaft, the guide means being formed as part of the housing, the distal end of the shaft moving in the guide means.

4. The transducer of claim 3 further including a spring located in the housing and acting on the side of the diaphragm exposed to vacuum.

5. In a feedback system for controlling the air-fuel ratio of a mixture supplied to a internal combustion engine, the system including an electronics control unit for receiving and processing electrical signals from a transducer, the improvement comprising a vacuum pressure transducer for sensing the engine's intake manifold vacuum pressure and for supplying a digital electrical signal representive thereof to the electronic control unit, the transducer including a housing having an inlet connected to the engine's intake manifold; a flexible diaphragm extending across the housing for one side of the diaphragm to be exposed to manifold vacuum; electrical switch means including a plurality of electrically conductive segments arranged in a predetermined pattern on a board of electrically non-conductive material; a shaft attached to the diaphragm and axially movable therewith; and, electrical contact means connected to the shaft, the electrical contact means including a wiper depending from the shaft and made of an electrically conductive material, the wiper having an upper tab end received in a slot formed in the shaft and a lower end which forms a continuous curved contact surface the width of which extends across the board on which the segments are arranged, the segments being arranged in a pattern in accordance with a predetermined binary code whereby the combination of segments contacted by the wiper at any one time produces a digital electrical signal representing manifold vacuum pressure at that time.

6. The improvement of claim 5 wherein the width of the lower end of the wiper is substantially wider than the width of the upper end thereof.

7. The improvement of claim 6 further including guide means formed as part of the housing, the distal end of the shaft moving in the guide means.

8. The improvement of claim 7 further including a spring located in the housing and acting on the side of the transducer exposed to manifold vacuum pressure.

* * * * *